(12) United States Patent
Smith et al.

(10) Patent No.: US 11,423,505 B2
(45) Date of Patent: Aug. 23, 2022

(54) ENCODED MONOCHROME IMAGES OF DATA-HIDING WATERMARKS

(71) Applicant: Hewlett-Packard Development Company, L.P., Spring, TX (US)

(72) Inventors: Greg S. Smith, San Diego, CA (US); Robert Ulichney, Stow, MA (US); William J. Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/056,086

(22) PCT Filed: Oct. 25, 2018

(86) PCT No.: PCT/US2018/057462
§ 371 (c)(1),
(2) Date: Nov. 17, 2020

(87) PCT Pub. No.: WO2020/086083
PCT Pub. Date: Apr. 30, 2020

(65) Prior Publication Data
US 2021/0256651 A1 Aug. 19, 2021

(51) Int. Cl.
*G06T 1/00* (2006.01)
*G06F 3/12* (2006.01)
*G06T 5/00* (2006.01)
*G06T 5/20* (2006.01)
*G06T 11/00* (2006.01)
*H04N 1/32* (2006.01)

(52) U.S. Cl.
CPC .......... *G06T 1/0021* (2013.01); *G06F 3/1296* (2013.01); *G06T 5/007* (2013.01); *G06T 5/20* (2013.01); *G06T 11/00* (2013.01); *H04N 1/32267* (2013.01); *H04N 1/32309* (2013.01)

(58) Field of Classification Search
CPC ......... G06T 1/0021; G06T 5/007; G06T 5/20; G06T 11/00; G06T 2201/0051; G06T 1/0028; G06F 3/1296; H04N 1/32267; H04N 1/32309
See application file for complete search history.

(56) References Cited

U.S. PATENT DOCUMENTS 8,385,592 B2   2/2013  Fisher et al.
9,380,186 B2   6/2016  Reed et al.
(Continued)

FOREIGN PATENT DOCUMENTS

CN   101706943   5/2010

OTHER PUBLICATIONS

Yeung, et al., "Fragile watermarking of three-dimensional objects." In Proceedings 1998 International Conference on Image Processing. ICIP98 (Cat. No. 98CB36269), vol. 2, pp. 442-446. IEEE, 1998.
(Continued)

*Primary Examiner* — Christopher Wait
(74) *Attorney, Agent, or Firm* — Fabian VanCott

(57) ABSTRACT

A method of forming a data-hiding watermark on a surface may include encoding data within an image using the chrominance data of the of the image, adjusting at least one characteristic of the image to enhance the prominence of the encoded data within the image, and printing the adjusted, encoded image onto the surface.

20 Claims, 12 Drawing Sheets

(56) References Cited

U.S. PATENT DOCUMENTS

| | | | |
|---|---|---|---|
| 2004/0125983 A1* | 7/2004 | Reed | G06T 1/0064 |
| | | | 375/E7.089 |
| 2004/0258274 A1 | 12/2004 | Brundage et al. | |
| 2006/0115110 A1* | 6/2006 | Rodriguez | G07D 7/0057 |
| | | | 382/100 |
| 2014/0218769 A1 | 8/2014 | Tolstaya et al. | |
| 2015/0378353 A1* | 12/2015 | Williams | G05B 19/4183 |
| | | | 700/119 |
| 2016/0117792 A1 | 4/2016 | Rolland-Neviere et al. | |
| 2017/0024845 A1 | 1/2017 | Filler et al. | |
| 2018/0129847 A1 | 5/2018 | Brundage et al. | |

OTHER PUBLICATIONS

De Queiroz et al: Reversible color—to—gray mapping using sub-band domain texturization Pattern Recognition Letters (Mar. 1, 2010), pp. 269-276.

Freitas Pedro Garcia et al: "Hiding color watermarks in halftone images using maximum—similarity binary patterns", Signal Processing. Image Communication, Elsevier Science Publishers (Aug. 26, 2016), pp. 1-11.

Hamza Abbass Al—Sewadi et al: "Improved processing speed for text watermarking algorithm in color images", Information Systems and Technologies (Mar. 16, 2018), pp. 1-7.

Al-Sewadi, H.A., et al., "Improved processing speed for text watermarking algorithm in color images," the 8th International Conference on Information Systems and Technologies, Article 7, Mar. 16, 2018, pp. 1-7.

De Queiroz, R.L., "Reversible color-to-gray mapping using sub-band domain texturization," Pattern Recognition Letters, vol. 31, No. 4, Mar. 1, 2010, pp. 269-276.

Freitas, P. G., et al., "Hiding color watermarks in halftone images using maximum-similarity binary patterns," Signal Processing Image Communication, vol. 48, Aug. 26, 2016, 13 pages.

* cited by examiner

ENCODED MONOCHROME IMAGES OF DATA-HIDING WATERMARKS

BACKGROUND

Two-dimensional (2D) and three-dimensional (3D) printing allow for a myriad of images and objects to be printed. These images and objects may be used to convey information to a user through the display of the 2D and 3D images.

A digital watermark is a marker covertly embedded in a noise-tolerant signal such as an audio, video or image data, and may be used to convey additional information about the subject matter of the media or object it is included on, identify ownership of the copyright of the media or object, or may serve some other purpose.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
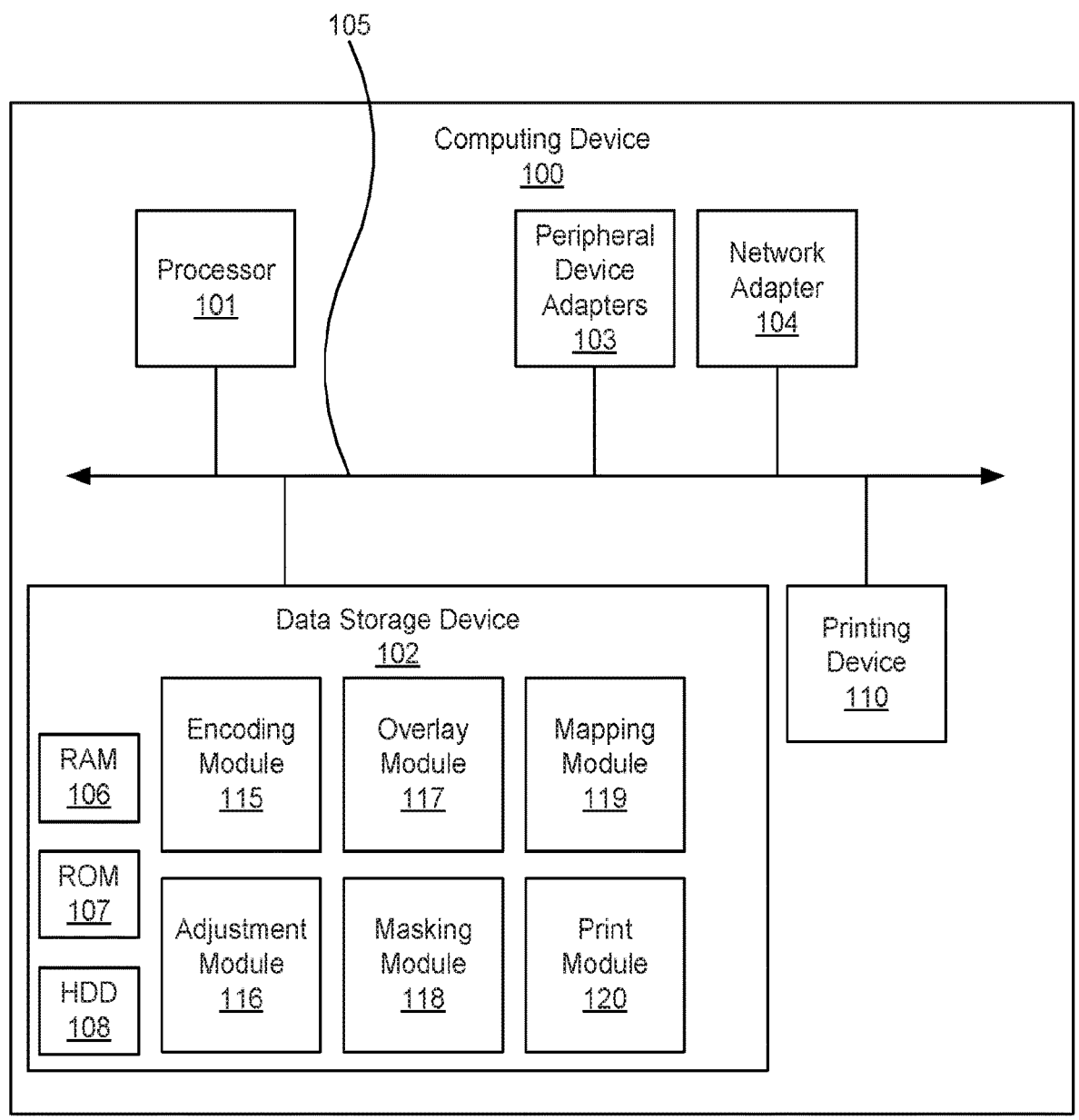
FIG. 1 is a block diagram of a computing device for creating and forming a data-hiding watermark on a 2D surface or a 3D surface, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Watermarking is a process for embedding information in images and documents. The embedded information is hidden within the image or document, and, when scanned with a watermark reading device, may launch a digital experience such as an internet browser instance, a universal resource locator (URL), an augmented reality instance, an audio and/or video playback instance, other digital experiences, may be used to track and tracs objects, may be used or item identification, may be used for document management, may be used for marketing purposes, or combinations thereof. In one example, the watermark reading device may be any device that is able to scan for, detect, read, and/or process the data-hiding watermark. For example, the watermark reading device may be a smart phone that includes an image capture device such as a camera and a watermark reading application executable thereon that may utilize the image capture device to scan for, detect, read, and/or process the data-hiding watermark.

Because the human visual system is much more sensitive to details in luminance rather than in the chrominance of an image, the methods described herein embed the encodable data into the chrominance component of the color image. It may be difficult, however, to render the encoded chrominance as a monochrome signal on either a 2D surface or as a relief map on a 3D surface. The systems and methods described herein provide for information-bearing watermarks to be easily mapped onto the surfaces of 3D objects and scanned with a watermark reading device including an image capture device (e.g., cameras) and using a data-hiding watermark reading application. The present systems and methods also provide an efficient and readily implementable method of designing data-bearing surface relief patterns not composed of a set of glyphs or symbols. Further, the present systems and methods also provide data-bearing surface patterns readable by 2D optical imaging devices with modest computational demands for encoding and decoding. Still further, the present systems and methods also provide machine readable data-bearing surface patterns that are not objectional to the eye, do not disfigure a 2D or 3D surface, and allow the 2D or 3D surface to retain its aesthetic qualities. Even further, the present systems and methods also provide a way to print and read a 2D chrominance-based information encoding scheme on a monochrome print or a 3D single-color fabricated surface. The present systems and methods also create a homogeneous texture on the surface of a 3D object that hides the watermark from a user's perception but still allows for access to the digital experience provided through the watermark.

Examples described herein provide a non-transitory computer readable storage medium comprising computer usable program code embodied therewith. The computer usable program code, when executed by a processor, creates an image corresponding to a data-hiding watermark applied to a surface. Formation of the image includes encoding data within the image using the chrominance data of the image, and converting the encoded image to monochrome to yield grayscale data. The computer usable program code, when executed by the processor, also prints the image on the surface.

The contrast of the encoded image may be boosted via a high pass filter, a low-pass filter, other filtering processes, or combinations thereof. The computer readable storage medium may also include computer usable program code to, when executed by the processor, mask the surface of a 3D object with the encoded image, and uniformly inflate and deflate the masked 3D surface to produce an encoded relief pattern on the 3D object defining the encoded image.

The surface may be the surface of a two-dimensional print media. The surface may be the surface of a three-dimensional (3D) object. The computer readable storage medium may also include computer usable program code to, when executed by the processor, create an overlay image superimposed on top of the encoded image.

Examples described herein also provide a non-transitory computer readable storage medium. The non-transitory computer readable storage medium includes computer usable program code embodied therewith for forming a data-hiding watermark on a surface. The computer usable program code to, when executed by a processor, encodes data within an image using the chrominance data of the of the image and converts the encoded image to monochrome to yield grayscale data. The computer usable program code to, when executed by a processor, prints the monochrome, encoded image onto the surface.

The computer readable storage medium may include computer usable program code to, when executed by the processor, boost the contrast of the encoded image. Further, the computer readable storage medium may include computer usable program code to, when executed by the processor, mask the surface of a 3D object with the encoded image, and uniformly inflate and deflate the masked 3D surface to produce an encoded relief pattern on the 3D object defining the encoded image.

The surface is a two-dimensional print media or a three-dimensional (3D) object. Further, the computer readable storage medium may include computer usable program code to, when executed by the processor, overlay an image onto the encoded image, the overlay image being user-identifiable.

Examples described herein also provide a method of forming a data-hiding watermark on a surface. The method may include encoding data within an image using the chrominance data of the of the image, adjusting at least one characteristic of the image to enhance the prominence of the encoded data within the image, and printing the adjusted, encoded image onto the surface.

Adjusting at least one characteristic of the image to enhance the prominence of the encoded data within the image may include converting the encoded image to monochrome to yield grayscale data, boosting the contrast of the encoded image, cropping the encoded image to enlarge encoded features of the encoded image, or combinations thereof. The method may also include on a three-dimensional (3D) object, masking the surface of the 3D object with the encoded image, and uniformly inflating and deflating the masked 3D surface to produce an encoded relief pattern on the 3D object defining the encoded image. Printing the monochrome, encoded image onto the surface may include printing the monochrome, encoded image onto the surface of a two-dimensional print media.

As used in the present specification and in the appended claims, the term "digital watermarking" is meant to be understood broadly as any process of presenting digital information. Digital watermarks may be used to convey additional information about the subject matter of the media or object it is included on, identify ownership of the copyright of the media or object, verify the authenticity or integrity of the media or object, serve some other purpose, or combinations thereof.

As used in the present specification and in the appended claims, the term "data-hiding watermark" is meant to be understood broadly as any kind of digital watermark that "hides" data therein by minimizing the impact of the aesthetic appearance of the object on which the watermark is applied, obscuring the watermark so that a user may not be able to visually perceive its presence on the object, or combinations thereof. In one example, the data-hiding watermark may be formed as part of a texture with a uniform appearance on a surface of media or an object while displaying in plain sight the watermark among the homogeneous texture. In other words, the inhomogeneity in the texture formed as part of the data-hiding watermark is how data is encoded in the watermark that is, at the same time, not apparent to the eye or human perception. In this example, hardware or a combination of hardware and software that can scan for, detect, read, and process the data-hiding watermark such as, for example, LINKREADER developed and distributed by HP, Inc.

Turning now to the figures, FIG. 1 is a block diagram of a computing device (100) for creating and forming a data-hiding watermark on a 2D surface or a 3D surface, according to an example of the principles described herein. The computing device (100) may be implemented in an electronic device. Examples of electronic devices include servers, desktop computers, laptop computers, personal digital assistants (PDAs), mobile devices, smartphones, gaming systems, and tablets 2D printing devices, 3D printing devices, other computing devices, and combinations thereof. In the examples described herein, the computing device may be part of a printing device in order to allow an image (i.e., a bitmap) processed using the methods described herein.

To achieve its desired functionality, the computing device (100) includes various hardware components. Among these hardware components may be a processor (101), a data storage device (102), a peripheral device adapter (103), and a network adapter (104). These hardware components may be interconnected through the use of a number of busses and/or network connections. In one example, the processor (101), data storage device (102), peripheral device adapter (103), and network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of encoding data within an image using the chrominance data of the of the image, converting the encoded image to monochrome to yield grayscale data, boosting the contrast of the encoded image, cropping the encoded image to enlarge encoded features of the encoded image, overlay an image onto the encoded image, and perform other functions according to the methods of the present specification described herein.

Further, in the case of 3D printing and the placement of the data-hiding watermark, the executable code may, when executed by the processor (101), cause the processor (101) to implement at least the functionality of masking the surface of a 3D object with the encoded image, and uniformly inflate and deflate the masked 3D surface to produce an encoded relief pattern on the 3D object defining the encoded image, according to the methods of the present specification described herein. In the course of executing code, the processor (101) may receive input from and provide output to a number of the remaining hardware units.

Still further, in the case of both 2D and 3D printing and the placement of the data-hiding watermark, the encoded image may be sent to the 2D or 3D printing device for printing. Thus, the surface on which the encoded image is printed may be a two-dimensional print media or a three-dimensional (3D) object. For example, a 2D print media may be paper, cloth, other substrates in which the encoded image may be printed. In another example, a 2D print media may be any surface that is already formed previous to the printing of the encoded image thereon. In another example, a 3D object may be any object that may be formed by a 3D printing device. In this example, the encoded image may be printed on the 3D object as the 3D object is formed by the 3D printing device.

Still further, in addition to the additive manufacturing processes such as the 3D printing processes described herein, the present systems and methods may be used on connection with computer numerical control (CNC) milling processes that produce a data-bearing watermarked object through subtractive manufacturing processes. Further, the present systems and methods may be used to produce a mold master from which many copies of a data-bearing component may be molded to easily mass-produce the object. Still further, a 2D printing press using a physical plate to transfer the image to paper may also be used to form the data-bearing watermark on a piece of media such as paper. In this example, the physical plate may be etched via a digitally controlled process to form the reverse of the data-bearing watermark. Thus, although 2D and 3D printing processes are described herein in connection with the formation of the data-bearing watermark, the term "printing: may also refer to fabricating, manufacturing, or otherwise producing the data-bearing watermark on any surface and using any process.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the computing device (100) enable the processor (101) to interface with various other hardware elements, external and internal to the computing device (100). For example, the peripheral device adapters (103) may provide an interface to input/output devices, such as, for example, display device (109), a printing device, a mouse, or a keyboard. The peripheral device adapters (103) may also provide access to other external devices such as an external storage device, a number of network devices such as, for example, servers, switches, and routers, client devices, other types of computing devices, and combinations thereof.

The computing device (100) further includes a number of modules used in the implementation of the functionality described herein. The various modules within the computing device (100) include executable program code that may be executed separately. In this example, the various modules may be stored as separate computer program products. In another example, the various modules within the computing device (100) may be combined within a number of computer program products; each computer program product including a number of the modules.

The computing device (100) may include an encoding module (115) to, when executed by the processor (101), encode the watermark into an image (i.e., a bitmap). FIGS. 7 through 10 are representations of the data hiding watermark at a plurality of stages of development, according to an example of the principles described herein. As the figures progress through FIGS. 7 through 10, the arrows indicate the manner in which the image is processed and the transition from A to A between FIG. 7 and FIG. 8, B to B between FIG. 8 and FIG. 9, and C to C between FIG. 9 and FIG. 10 indicate this progression between figures or pages.

Figure 7:
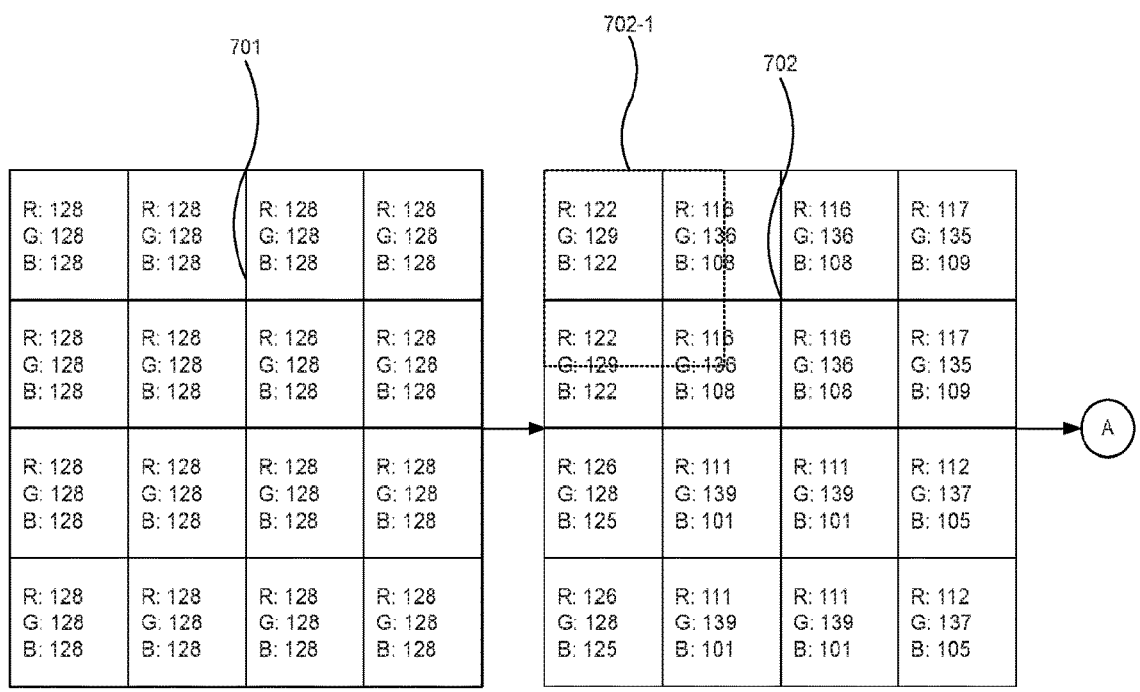
FIGS. 7 through 10 are representations of the data hiding watermark at a plurality of stages of development, according to an example of the principles described herein.

In FIG. 7, a color image (701) such as a JPEG image may be created. Although the color image (i.e., bitmap) may include a uniform gray value such as RGB values of 50%, 50%, 50% as depicted in FIG. 7, in another example, a white image with RGB values 255%, 255%, 255%, an image that is non-uniform in color, or any other image. The encoding module (115) utilizes any process to embed information into the color-based image (701). In one example, the encoding module (115) utilizes the LINK CREATION STUDIO (LCS) data embedding utility developed and distributed by HP, Inc. The LCS, acting herein as the encoding module (115), receives data including data defining the image and data defining the digital experience such as a uniform resource locator (URL), and returns the image with an embedded watermark defining the digital experience. In an example where the original image is a uniform grey as depicted in the color image (701), the returned image depicted by the encoded image (702) may appear to be grey as well, but mottled (i.e., spotted or blotched in coloring). The mottling included in the encoded image (702) may be subtle, and most pixels within the image may have values within a narrow band of digital counts centered on 127 digital counts with most pixels being between 107 and 147 digital counts. In this manner, the encoding module (115) adjusts the chrominance of pixels to encode the frequency-domain data payload as a low-visibility watermark within the encoded image (702). The originally neutral image depicted in the color image (701) is mottled in the color domain as depicted in the encoded image (702). Because it may be difficult to independently modulate chrominance within the encoded image (702), some lightness variations in pixels of the information-bearing intermediate image may be present in the encoded image (702).

In the example portrayed in FIG. 7 at the block containing the encoded image (702), a portion (702-1) of the encoded image (702) may contain the encoded data and the remainder of the encoded image (702) may be homogeneous to the portion (702-1) of the pattern (702) so that the portion (702-1) of the encoded image (702) blends in or is hidden within the overall encoded image (702). In another example, the portion (702-1) of the encoded image (702) may be repeated throughout the encoded image (702) so that a user may capture, with a watermark reading device, any portion of the encoded image (702) to gain access to the digital experience. Thus, the encoded image (702) may be created from a color image using the chrominance data of the image, and defines the encoded data that provides a user with access to the digital experience. In one example, the encoded image (702) may include the chrominance values of the watermark.

Figure 8:
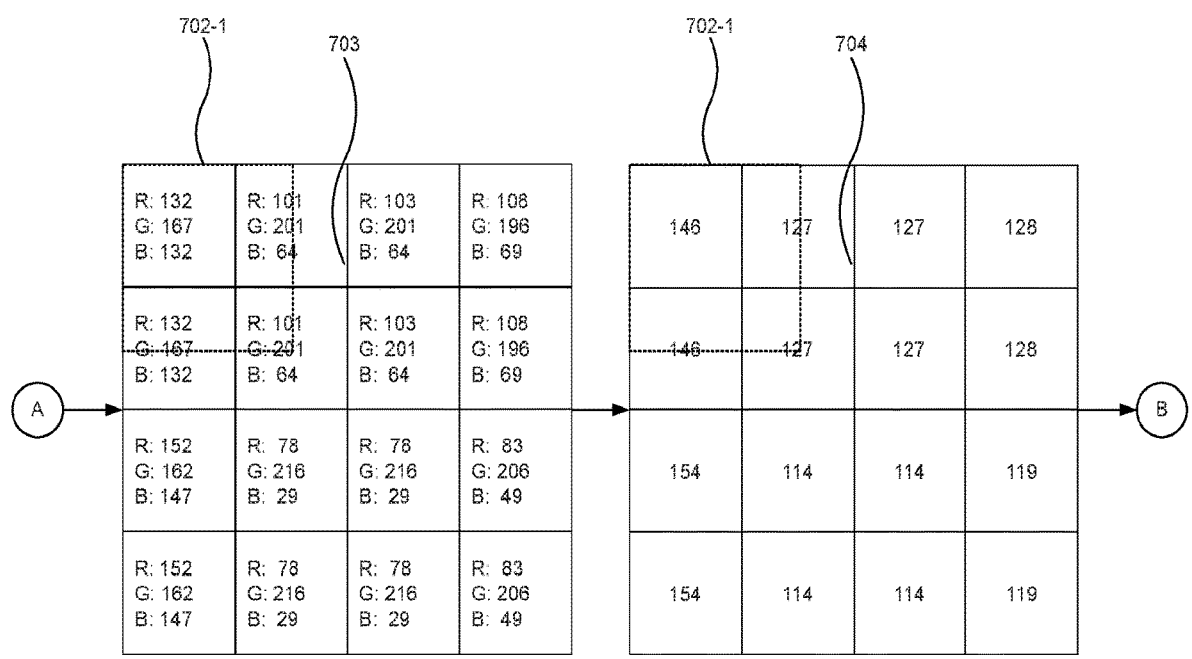

The computing device (100) may include an adjustment module (116) to, when executed by the processor (101), adjust a number of characteristics of the encoded image (702). In an example, a number of adjustments may be made to the encoded image (702) to assist a user and a watermark reading device in being able to scan for, detect, read, and/or process the data-hiding watermark. Thus, the computing device (100) may include the adjustment module (116) to make these adjustments to the encoded image (702). These adjustments may include adjusting the contrast of the encoded image (702) as depicted in the contrast-adjusted, encoded image (703) of FIG. 8. In one example, the contrast may be adjusted to adjust the luminance or color to obtain an image that causes the encoded data of the encoded image (702) to be more distinguishable by a user and/or a watermark reading device as depicted in the contrast-adjusted, encoded image (703). Thus, the contrast of the contrast-adjusted, encoded image (703) may be adjusted so the mottling is much more pronounced. The adjustment of the contrast may be performed using any histogram adjustment processes such as, for example, the levels adjustment feature provided by PHOTOSHOP raster graphics editor developed and distributed by Adobe Systems, image manipulation processing provided by OPEN SOURCE COMPUTER VISION (OPENCV) developed and distributed by Intel Corporation, or any other image manipulation toolset. Once the adjustment module (116) adjusts the contrast of the encoded image (702), the encoded data patterned into the of the contrast-adjusted, encoded image (703) becomes visible as depicted in FIG. 8, element (703). In one example, the contrast of the encoded image (702) may be adjusted using a high-pass filter, a low-pass filter, other image filtering processes, or combinations thereof.

The adjustment module (116) may also convert the contrast-adjusted, encoded image (703) to monochrome by discarding all chrominance information within the contrast-adjusted, encoded image (703) to form a greyscale encoded image (704). A monochrome image (704) is an image that is composed of one color such as may be the case in a grayscale or black-and-white image. The adjustment module (116) may further crop the greyscale encoded image (704) to an appropriate size and shape. Cropping the greyscale encoded image (704) allows for the encoded features of the greyscale encoded image (704) to be enlarged as depicted in the cropped, encoded image (705) depicted in FIG. 9. In one example, the portion (702-1) of the encoded image (702) may be the portion that is retained as the cropped, encoded image (705). In one example, the encoding module (115) and the adjustment module (116) may provide an encoding scheme that provides for redundancy where multiple small areas of the image in, for example, the encoded image (702) carry the full payload of the digital experience.

Figure 9:
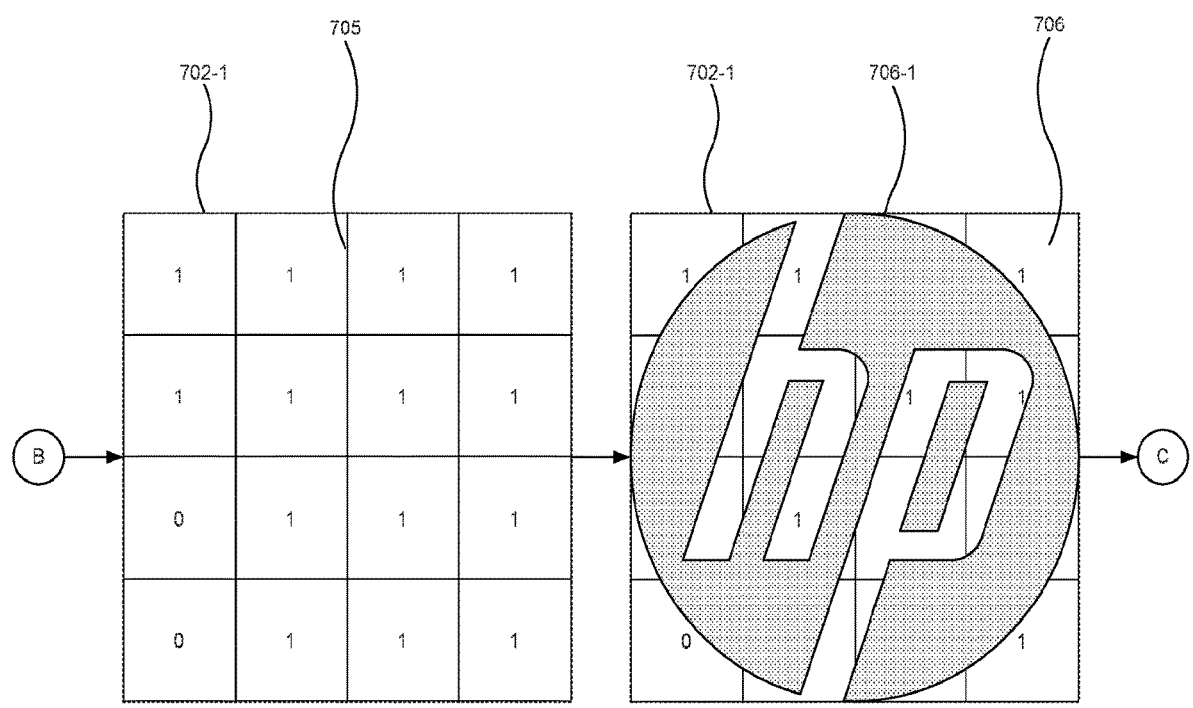

The computing device (100) may include an overlay module (117) to, when executed by the processor (101), create an overlay image on the encoded image (705) to create an overlay encoded image (706). In this example, any overlay image (706-1) may be placed over or added to the image, and this overlay image (706-1) may serve to identify a source of the 2D media or the 3D object once printed, direct a user to an area of the 2D media or the 3D object where the scannable watermark is located, or otherwise provide added imagery to the 2D media or the 3D object. In the example of FIG. 9, the overlay object (706-1) is the HP Inc. logo, but any image may be placed on the encoded image (705) as part of the overlay encoded image (706). In an example, the overlay image (706-1) may be adjusted to reduce layer opacity of the overlay image (706-1) in order to allow the encoded image to be printed and viewable through the overlay image (706-1). For example, a reduction of layer opacity to approximately 40% may provide enough opacity to allow the underlying encoded image (705) to be scannable by a watermark reading device. In another example, the computing device (100) may allow for the user to select that no overlay image (706-1) be added to the encoded image (705) and allow the overlay module (117) to be bypassed.

The computing device (100) may include a masking module (118) to, when executed by the processor (101), mask a surface of a 3D object with the encoded image (705) in an instance where the encoded image (705) is to be printed as part of a 3D object. Masking of a 3D surface of a 3D object includes placing the encoded image (705) over a surface of a digital representation of the 3D object to be printed where the transparent areas may be specified through a binary mask, for example. In this manner, for each 3D object to be printed, two bitmaps images) are actually produced. The first image produced is the actual image in which the unused areas are given a pixel value with all bits set to 0s. The second image produced is an additional mask in which the correspondent image areas are given a pixel value of all bits set to 0s and the surrounding areas a value of all bits set to 1s. This produces a 3D object with the encoded image (705) included on one of its surfaces. In one example, the contrast of the encoded image (705) may be further increased, and, in the extreme, the contrast may be binarized by picking an appropriate threshold value.

Continuing with the case of printing the encoded image (705) onto a surface of a 3D object, the encoded image (705) may be used as a pattern to inflate and/or deflate a surface of a 3D model representing the to-be-printed 3D object using a mapping module (118) of the computing device (100). The encoded image (205) may be texture mapped onto a flat surface, for example, of the 3D model, and areas where the encoded image (205) is white may be raised and areas where the encoded image (205) is black may be lowered a small amount to create a texture along the surface of the 3D model that is homogeneous along the surface of the 3D model so as to be hidden among the homogeneously textured surface. In one example, the raised areas may be raised, for example, 0.25 millimeters (mm), while the depressed or lowered areas may be lowered, for example, 0.25 mm. In this manner, the texture is created on the surface of the 3D object, and the texture carries the frequency-encoded information originally embedded or encoded in the image as a watermark.

In one example, a spatial low-pass filter may be applied to the inflation and/or deflation of the data-hiding watermark to create a texture that is less pixelated and instead creates an "orange peel" type texture that hides the watermark within the texture. Thus, as opposed to a rectangular area of the watermark that uniformly assigns a Z-axis value of plus X or minus X to create a pixelated surface resulting in a texture would look like tiles that are individually either slightly raised or lowered from a reference plain, the texture provided by the spatial low-pass filter rounds off sharp edges and provides a smoothed surface that is less identifiable by the human eye and is, instead, passed off as the texture of the object. an orange peel appearance. Thus, although the examples described herein may be used to create a pixelated texture on a 2D or 3D surface, the spatial low-pass filter may be used to further hide the data-hiding watermark from human perception.

In the case of both 2D and 3D printing of the encoded image (702, 703, 704, 705, 706) onto a 2D media or a 3D object, respectively, the encoded image (702, 703, 704, 705, 706) may be sent to a printing device (110) for printing using the print module (120) of the computing device (100). The encoded image (702, 703, 704, 705, 706) may be sent at any stage of development after its state of development at 702 of FIG. 7 since contrast adjustment, greyscaling, cropping, and overlaying may or may not be applied to an encoded image (702), and, therefore the encoded image (702, 703, 704, 705, 706) may be collectively referred to hereinafter as (702). The computing device (100) may include the printing module (120) to, when executed by the processor (101), prepare the encoded image (702) for printing and send data representing the encoded image (702) to the printing device (110). In one example, the computing device (100) and the printing device (110) may be collectively one device as depicted in FIG. 1. In another example, the computing device (100) and the printing device (110) may be separate networked devices where data representing the encoded image (702) is sent over the network via the peripheral device adapters (103) or the network adapter (104) of the computing device (100) to the printing device (110) located externally to the computing device (100).

The printing device (110) may be a 2D printing device in the case where the encoded image (702) is to be printed on 2D media such as, for example, paper. In this example, the print module (120) may prepare the encoded image (702) by converting the encoded image (702) into data that represents the pixels of the encoded image (702) as digitally addressable ink droplets. The printing device (110) in this example may be a 2D printing device such as an inkjet printing device, a laser jet printing device, or toner-based printing device, among others. The encoded image (102) is printed on the 2D media as a 2D image that is scannable by a watermark reading device.

In another example, the printing device (110) may be a 3D printing device in the case where the encoded image (702) is to formed as part of a 3D object. In this example, the print module (120) may ensure that the masking module (118) and the mapping module (119) are executed by the computing device (110) as to the encoded data (702), and sends that data representing a 3D model of the to-be-printed 3D object as modified by the encoded image (702) to a 3D printing device. The 3D printing device may be any printing device capable of forming a 3D object such as, for example, any additive or subtractive 3D printing devices including a stereolithographic (SLA) 3D printing devices, digital light processing (DLP) 3D printing devices, fused filament fabrication (FFF) 3D printing devices, selective laser sintering (SLS) 3D printing devices, selective laser melting (SLM) 3D printing devices, direct metal laser sintering (DMLS) 3D printing devices, electron beam melting (EBM) 3D printing devices, laminated object manufacturing (LOM) 3D printing devices, material jetting (MJ) 3D printing devices, drop on demand (DOD) 3D printing devices, binder jetting (BJ) 3D printing devices, and other types of 3D printing devices. The encoded image (102) is printed as part of the 3D object formed by the 3D printing process, and is scannable by a watermark reading device.

Figure 10:
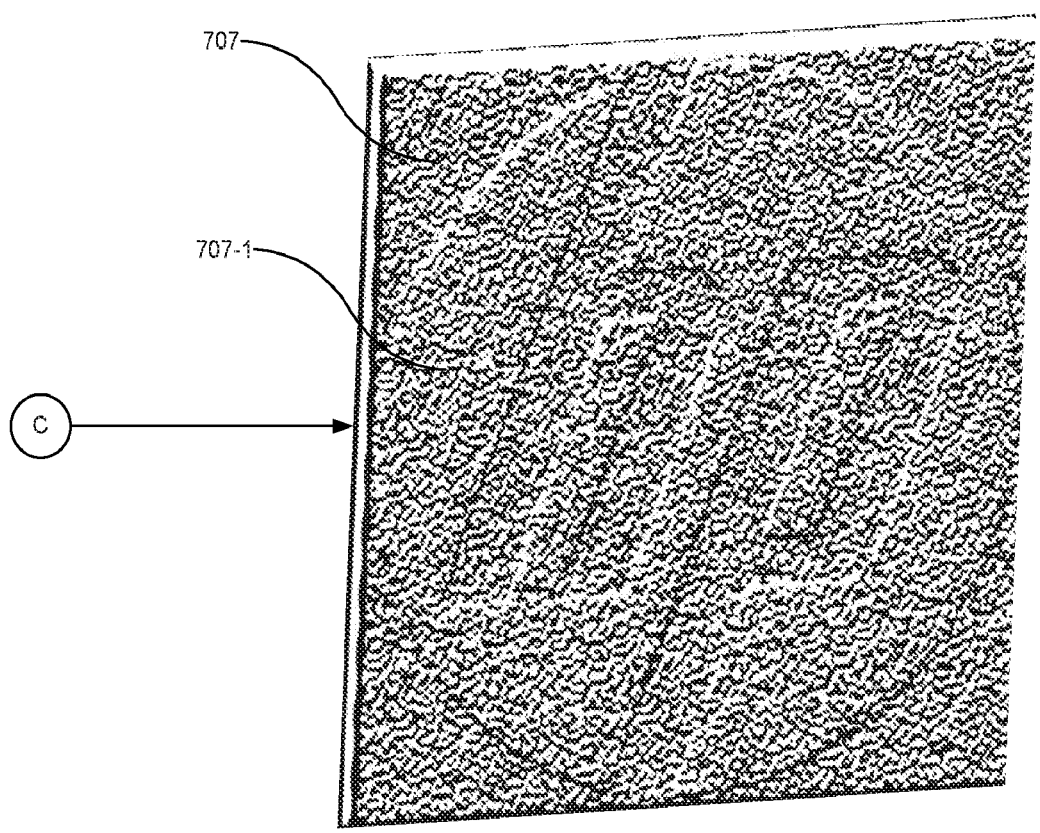

In the case of 3D printing the encoded image (102) as part of the 3D object formed, the 3D model (707) depicted in FIG. 10 represents the 3D encoded image (706) with the overlay image (706-1) applied to it. The 3D model (707), when printed, will include the overlay image (706-1) as a user-identifiable portion (707-1) of the 3D object, whereas the encoded image (702, 703, 704, 705) is unrecognizable by a user, and is simply passed off by the user as texturing on the surface of the printed 3D object. In this manner, the encoded information provided by the encoded image is hidden in plain sight with respect to a user, and is not depicted in an overt manner such as other scannable elements are such as quick response (OR) codes, bar codes, and other scannable elements that detract from the visual aesthetics of the 2D or 3D printed item.

Figure 11:
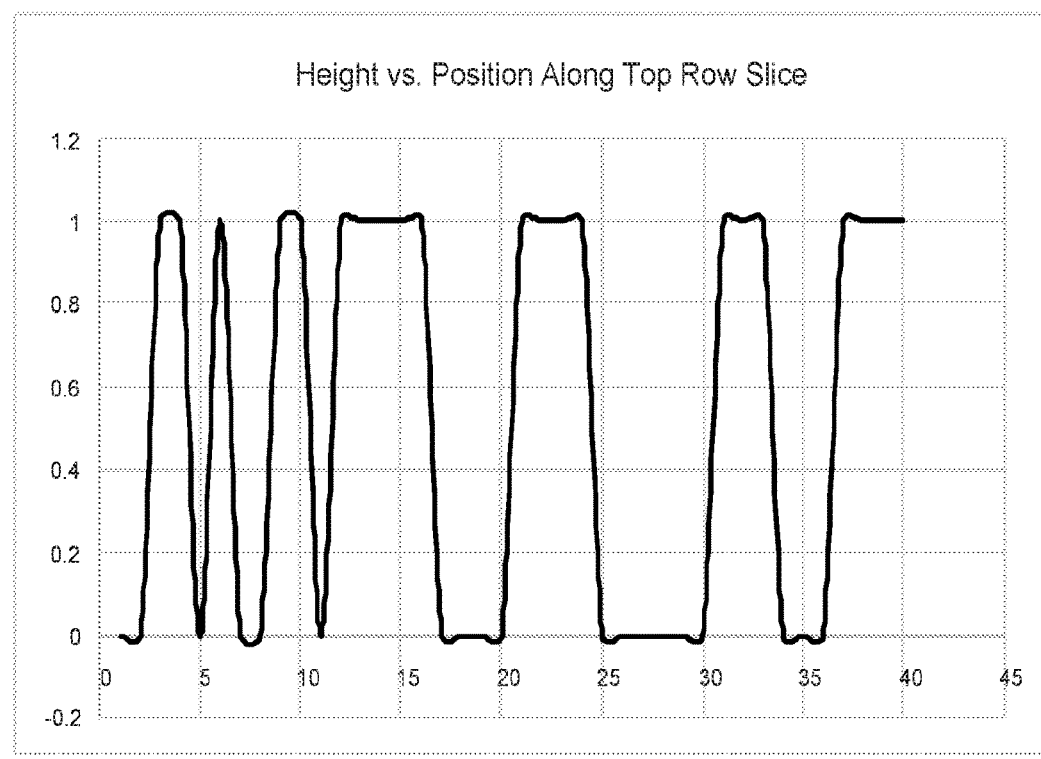
FIG. 11 is a table depicting height versus position within a first slice through the surface of the 3D object of FIG. 10, according to an example of the principles described herein.
Figure 12:
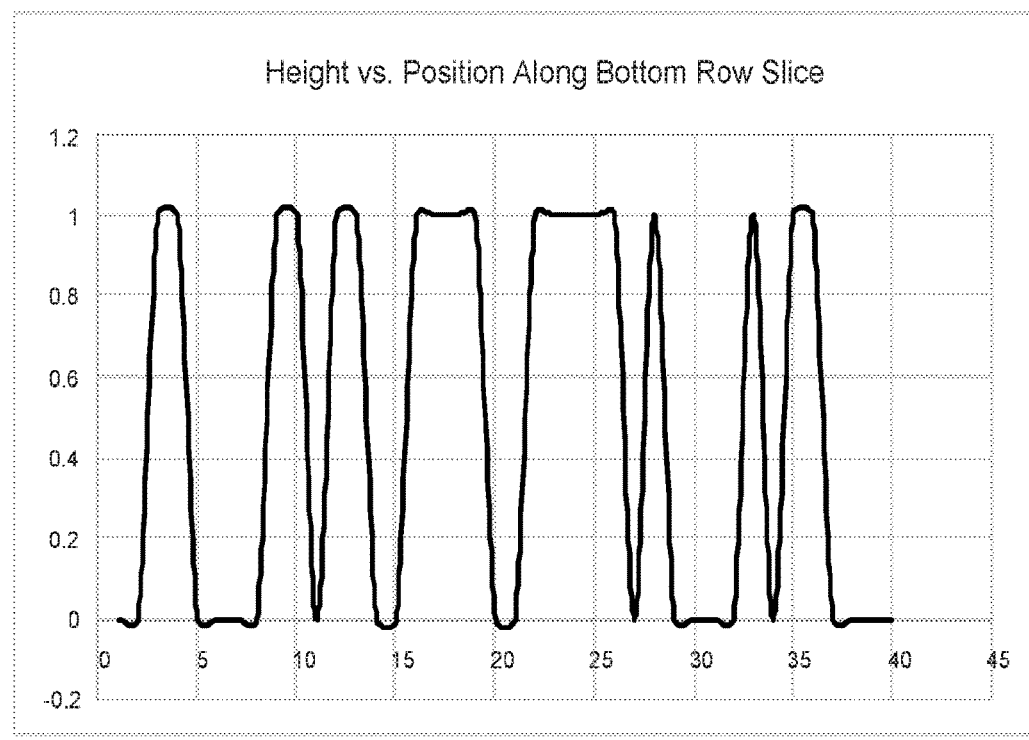
FIG. 12 is a table depicting height versus position within a second slice through the surface of the 3D object of FIG. 10, according to an example of the principles described herein.

FIG. 11 is a table (1100) depicting height versus position within a first slice through the surface of the 3D model (707) of FIG. 10, according to an example of the principles described herein. Further, FIG. 12 is a table (1200) depicting height versus position within a second slice through the surface of the 3D object of FIG. 10, according to an example of the principles described herein. In FIG. 11, the pixels run along the x-axis and include the binary sequence as follows: 00110100110111110000111100000011100001111. The y-axis of the table (1100) reflects the height of the valleys and mountains created in the surface of the 3D model (707) of FIG. 10, and the x-axis of the table (1100) reflects the position of the valleys and mountains across the surface of the 3D model (707). Similarly, in FIG. 12, the pixels run along the x-axis and include the binary sequence as follows: 001100001101100111100111110100001011000. The y-axis of the table (1200) again reflects the height of the valleys and mountains created in the surface of the 3D model (707) of FIG. 10, and the x-axis of the table (1200) reflects the position of the valleys and mountains across the surface of the 3D model (707). In this manner, the surface of a 3D object may be encoded with data hidden in plain sight with respect to a user, and the user passes the surface of the 3D object as texturing.

The watermark reading device described herein may be any device capable of detecting a printed encoded image as printed on a 2D media or as part of a 3D object. In one example, the watermark reading device may be a smart phone that includes an image capture device such as a camera and a watermark reading application executable thereon that may utilize the image capture device to scan for, detect, read, and/or process the data-hiding watermark. The watermark reading application executable on the smart phone may be, for example, the LINK READER watermark reading application developed and distributed by HP, Inc. The watermark reading device and its associated application are designed to scan the hardcopy version of the image returned by the printing device (110).

The computing device (100) of FIG. 1 takes a frequency-modulated, information-bearing 2D image, and processes it into a 2D binary "image" that serves as instructions for elevation and/or depression of a surface of a 3D object. In the case of printed 3D objects including the encoded image (702) formed on rounded or spherical portions of the 3D object, the adjustment module (116) may also pre-warp the inflated and/or deflated pattern map applied to the 3D model that is to be printed so it is geometrically undistorted in appearance when captured from a defined vantage point by the watermark reading device. In another example, the watermark reading device may de-warp a captured image before attempting to decode information from the watermark formed on the 3D object so as to access the encoded image and its digital experience.

In one example, instead of using a 3D printing device to form the encoded image on a 3D object, the encoded image (702, 703, 704, 705, 706, 707) obtained from the processes described may be used to tool a mold. In this example, the mold may be used to mass-produce 3D information-bearing parts or objects. Further, in both the mold example described here and the 3D printing example described herein, the 3D object may carry a unique information payload such as a serial number as its digital experience. This allows the object to retain a clean, unmarked surface.

Figure 2:
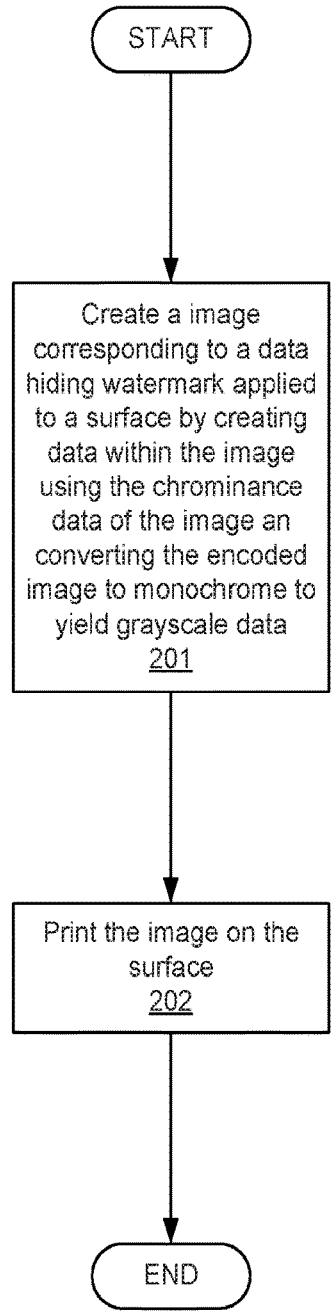
FIG. 2 is a flowchart showing a method of creation and printing of an image corresponding to a data-hiding watermark, according to an example of the principles described herein.

FIG. 2 is a flowchart showing a method (200) of creation and printing of an image corresponding to a data-hiding watermark, according to an example of the principles described herein. The method (200) may include creating (block 201) an image (i.e. a bitmap) corresponding to a data-hiding watermark applied to a surface where the formation of the image includes encoding data within the image using the chrominance data of the image and converting the encoded image to monochrome to yield grayscale data. The creation (block 201) of the image includes those processes described herein in connection with the execution of the encoding module (115), the adjustment module (116), the overlay module (117), the masking module (118), the mapping module (119), and combinations thereof. The method of FIG. 2 may also include printing (block 202) the image on the surface of a 2D media or a 3D object through execution of the printing module (120) and through use of the printing device (110).

Figure 3:
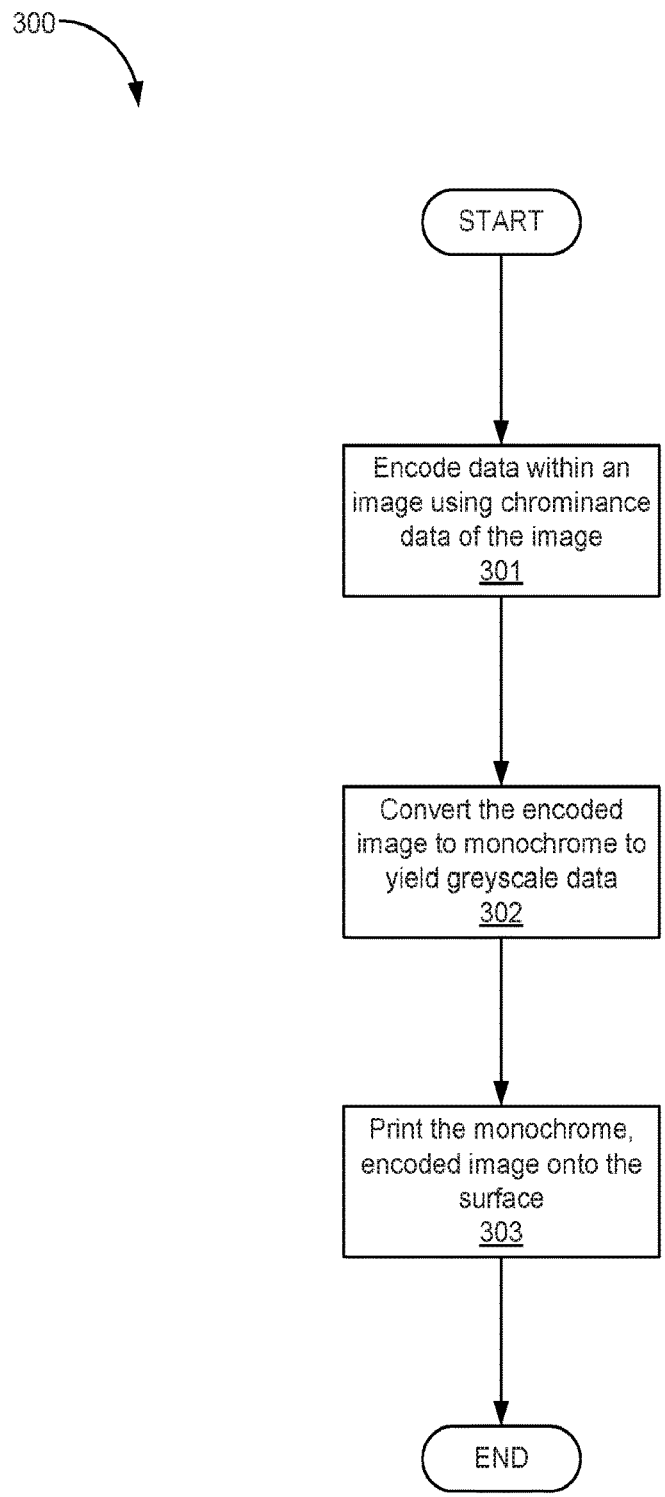
FIG. 3 is a flowchart showing a method of forming a data-hiding watermark on a surface, according to an example of the principles described herein.

FIG. 3 is a flowchart showing a method (300) of forming a data-hiding watermark on a surface, according to an example of the principles described herein. The method (300) may include encoding (block 301) data within an image using the chrominance data of the image by, with the processor (101) of the computing device (100), executing the encoding module (115). The encoded image may be converted (block 302) to a monochrome image through execution of the of the adjustment module (116). The monochrome, encoded image may be printed (block 303) onto the surface of the 2D media or the 3D object through execution of the printing module (120) and through use of the printing device (110) as described herein. Further, the image includes those processes described herein in connection with the execution of the encoding module (115), the adjustment module (116), the overlay module (117), the masking module (118), the mapping module (119), and combinations thereof.

Figure 4:
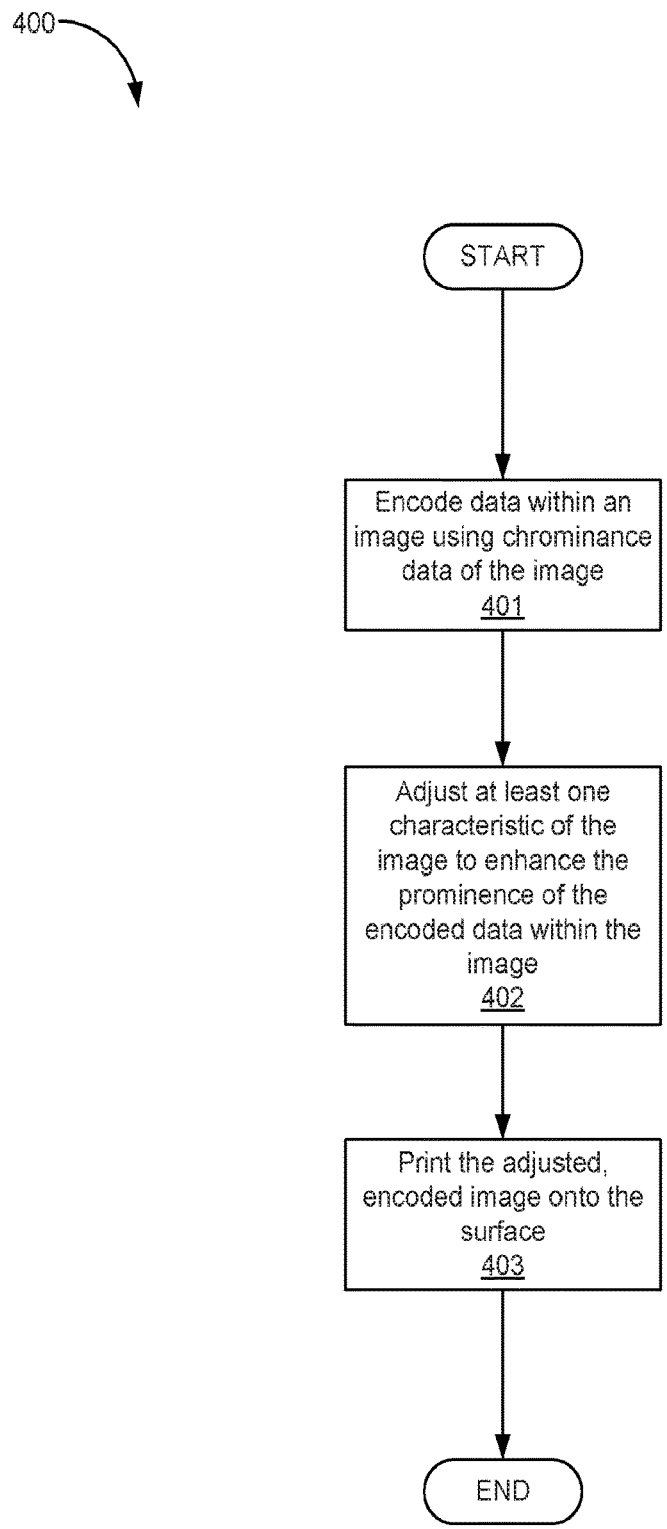
FIG. 4 is a flowchart showing a method of forming a data-hiding watermark on a surface, according to an example of the principles described herein.

FIG. 4 is a flowchart showing a method (400) of forming a data-hiding watermark on a surface, according to an example of the principles described herein. The method (400) may include encoding (block 401) data within an image using the chrominance data of the image by, with the processor (101) of the computing device (100), executing the encoding module (115).

The method may also include adjusting (block 402) at least one characteristic of the image to enhance the prominence of the encoded data within the image. Adjustment (block 402) of the image may be performed through the execution of the adjustment module (116) and the overlay module (117) to convert the encoded image to monochrome to yield grayscale data, boost the contrast of the encoded image, crop the encoded image to enlarge encoded features of the encoded image, overlay an image onto the encoded image, and perform other functions according to the methods of the present specification described herein.

The method (400) of FIG. 4 may also include printing (block 403) the adjusted, encoded image onto a surface of the 2D media or the 3D object. Printing (403) of the adjusted, encoded image in the case of a 3D object may include executing the masking module (118) and the mapping module (119) to create an 3D model of the object for transmission to a 3D printing device for printing. Further, printing (block 403) the adjusted, encoded image may include executing the printing module (120) and instructing the printing device (110) to print the adjusted, encoded image.

Figure 5:
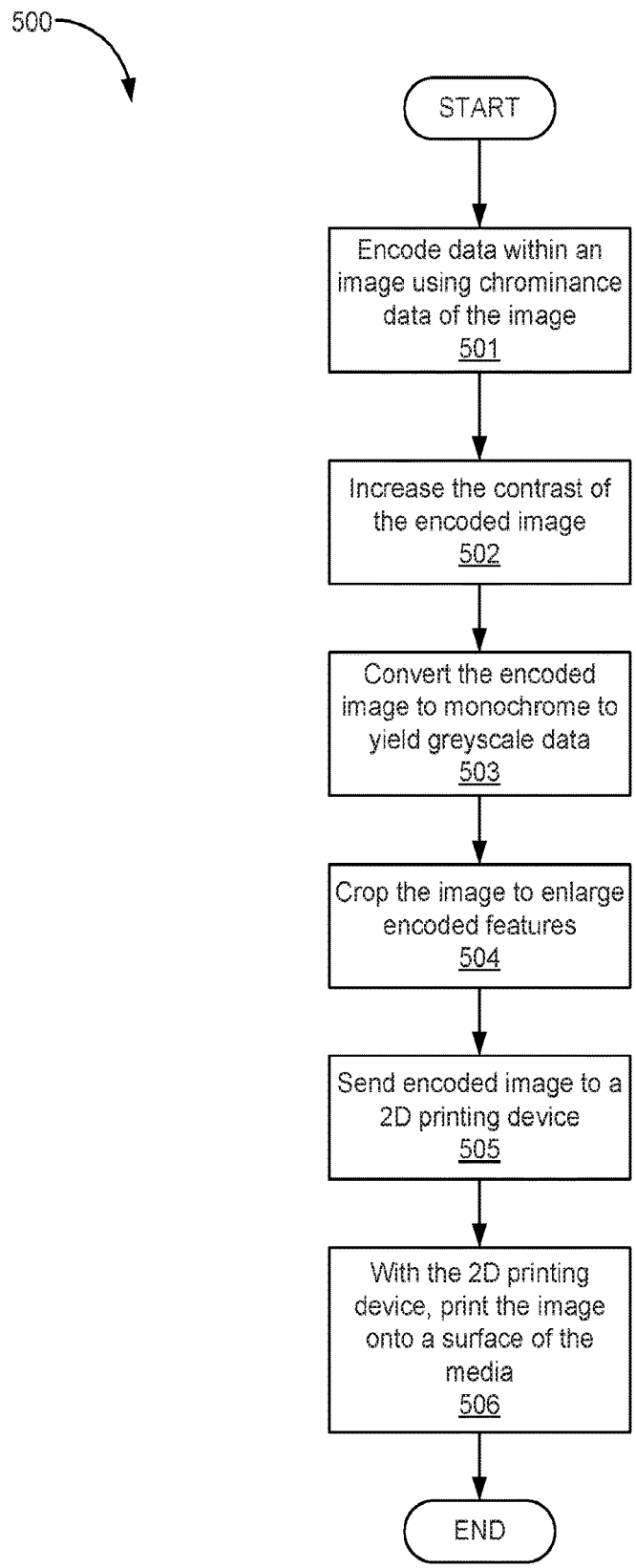
FIG. 5 is a flowchart showing a method of forming a data-hiding watermark on a 2D surface, according to an example of the principles described herein.

FIG. 5 is a flowchart showing a method (500) of forming a data-hiding watermark on a 2D surface, according to an example of the principles described herein. As described herein, the encoded image may be applied to a 2D surface such as paper. The method (500) of FIG. 5 may include encoding (501) data within an image using the chrominance data of the image. The contrast of the encoded image may be increased (block 502) through execution of the adjustment module (116) in order to increase the readability of the encoded data within the encoded image by a watermark reading device.

The method (500) may also include converting (block 503) the encoded image to a monochrome image to yield greyscale data. The method (500) may also include cropping (block 504) the image to enlarge encoded features of the encoded image. This cropping and enlargement of the image makes the encoded data of the encoded image more easily detectable by a watermark reading device. The encoded image may be sent (block 505) to a 2D printing device, and with the 2D printing device and through execution of the printing module (120), the encoded image may be printed on the 2D surface.

Figure 6:
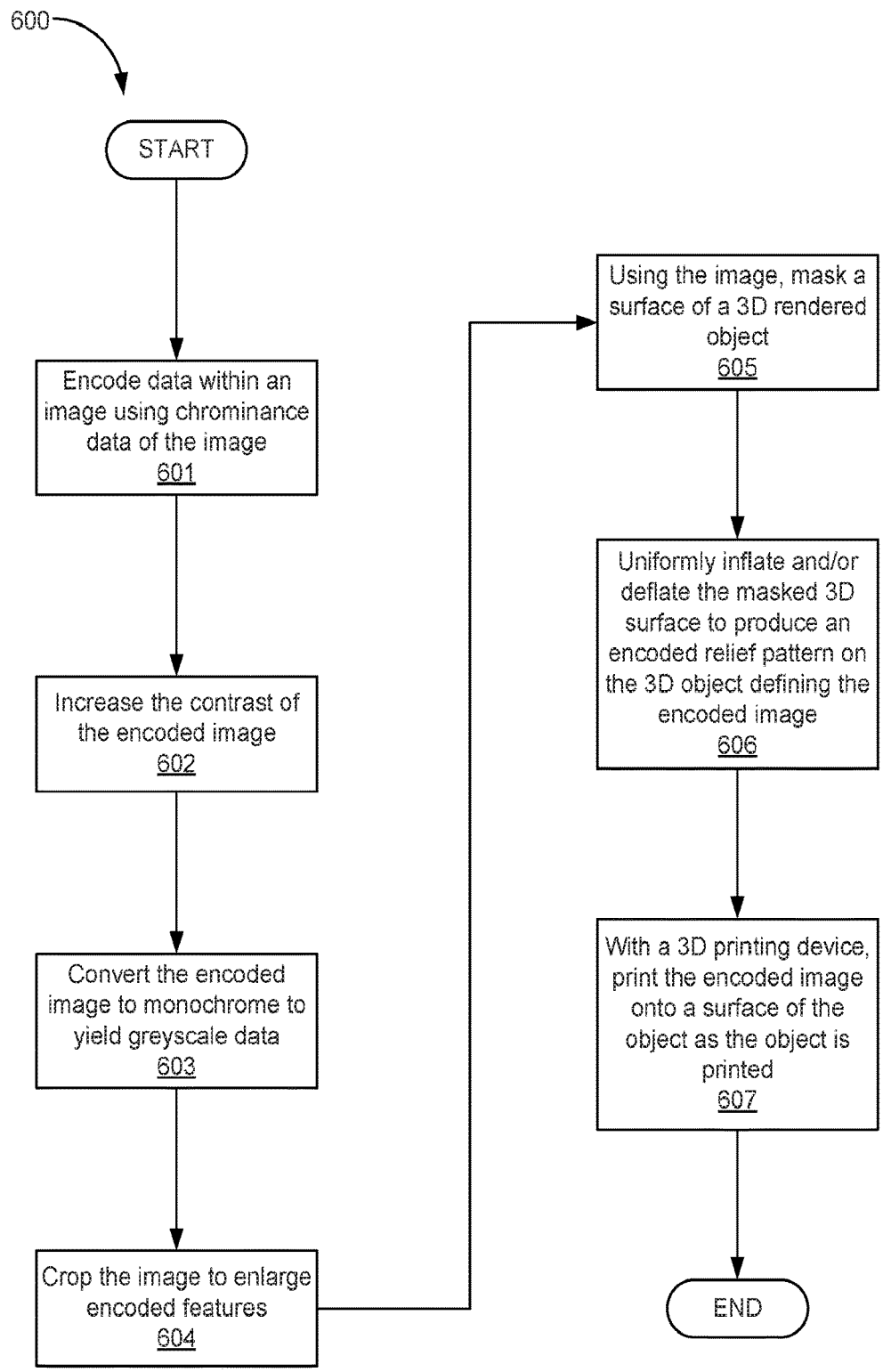
FIG. 6 is a flowchart showing a method of forming a data-hiding watermark on a 3D surface, according to an example of the principles described herein.

FIG. 6 is a flowchart showing a method (600) of forming a data-hiding watermark on a 3D surface, according to an example of the principles described herein. The method (600) of FIG. 6 may include encoding (block 601) data within an image using the chrominance data of the image. The contrast of the encoded image may be increased (block 602) through execution of the adjustment module (116) in order to increase the readability of the encoded data within the encoded image by a watermark reading device.

The method (600) may also include, through the execution of the adjustment module (116), converting (block 603) the encoded image to a monochrome image to yield greyscale data, and cropping (block 604) the image to enlarge encoded features of the encoded image. This cropping and enlargement of the image makes the encoded data of the encoded image more easily detectable by a watermark reading device. Through execution of the masking module (118), the surface of a 3D rendered object such as a 3D model of a to-be-printed 3D object may be masked (block 605). The mapping module (119) may be executed to uniformly inflate and/or deflate the masked 3D surface to produce an encoded relief patter on the 3D model representing the 3D object. The relief pattern defines the encoded image and its ability to be detected and processed by a watermark reading device.

Through execution of the print module (120), the encoded image may be processed and sent to a 3D printing device (110) to print (block 607) the encoded image onto a surface of the object. As described herein, printing (block 607) the encoded image may include forming a 3D object through a 3D printing process or, in another example, creating a mold by which the 3D object may be mass-produced.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the computing device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of forming a data-hiding watermark on a surface. The method may include encoding data within an image using the chrominance data of the of the image, adjusting at least one characteristic of the image to enhance the prominence of the encoded data within the image, and printing the adjusted, encoded image onto the surface.

Watermarks designed for color rendering cannot be rendered and recovered from fabricated single-color 3D surfaces, or on monochrome 2D prints without the systems and methods described herein. The systems and methods described herein provide for information-bearing watermarks to be easily mapped onto the surfaces of 3D objects and scanned with a watermark reading device including an image capture device (e.g., cameras) and using a data-hiding watermark reading application. The present systems and methods also provide an efficient and readily implementable method of designing data-bearing surface relief patterns not composed of a set of glyphs or symbols. Further, the present systems and methods also provide data-bearing surface patterns readable by 2D optical imaging devices with modest computational requirements for encoding and decoding. Still further, the present systems and methods also provide machine readable data-bearing surface patterns that are not objectional to the eye, do not significantly disfigure a 2D or 3D surface and do so but at a sufficiently high range of frequencies that the surface pattern likely will not detract from the appearance of the object, and allow the 2D or 3D surface to retain its aesthetic qualities. Even further, the present systems and methods also provide a way to print and read a 2D chrominance-based information encoding scheme on a single-colorant (i.e., monochrome) print or a 3D single-color fabricated surface. The present systems and methods also create a homogeneous texture on the surface of a 3D object that hides the watermark from a user's perception but still allows for access to the digital experience provided through the watermark.

The preceding description has been presented to illustrate and describe examples of the principles described. This description is not intended to be exhaustive or to limit these principles to any precise form disclosed. Many modifications and variations are possible in light of the above teaching.

What is claimed is:

1. A non-transitory computer readable storage medium comprising computer usable program code embodied therewith, the computer usable program code to, when executed by a processor:
   create an image corresponding to a data-hiding watermark applied to a surface, formation of the image comprising:
   encoding data within the image using the chrominance data of the image; and
   converting the encoded image to monochrome to yield grayscale data.

2. The computer readable storage medium of claim 1, wherein the contrast of the encoded image is boosted via a high pass filter.

3. The computer readable storage medium of claim 1, comprising computer usable program code to, when executed by the processor:
   mask the surface of a 3D object with the encoded image; and
   inflate and deflate the masked 3D surface to produce an encoded relief pattern on the 3D object defining the encoded image.

4. The computer readable storage medium of claim 1, wherein the surface is the surface of a two-dimensional (2D) print media.

5. The computer readable storage medium of claim 1, wherein the surface is the surface of a three-dimensional (3D) object.

6. The computer readable storage medium of claim 1, comprising computer usable program code to, when executed by the processor, create an overlay image superimposed on top of the encoded image.

7. A system for forming a data-hiding watermark on a surface, comprising:
   a processor;
   a data storage device storing computer usable program code;
   an encoding module to, when executed by the processor, encode data within an image using the chrominance data of the of the image;
   an adjustment module to, when executed by the processor, convert the encoded image to monochrome to yield grayscale data;
   a masking module to, when executed by the processor:
   mask the surface with the encoded image; and
   raise and lower portions of a digital representation of the surface based on the mask;
   a print module to, when executed by the processor print the monochrome, encoded image onto the surface; and
   a printing device to:
   receive data output by the print module; and
   print the data-hiding watermark on the surface.

8. The system of claim 7 wherein the printing device is a two-dimensional (2D) printing device, or a three-dimensional (3D) printing device.

9. A method of forming a data-hiding watermark on a surface, comprising:
   encoding data within an image using the chrominance data of the of the image;

converting the image to monochrome to yield grayscale data to enhance the prominence of the encoded data within the image;

overlaying an overlay image onto the adjusted encoded image;

adjusting a layer opacity of the overlay image; and printing the overlay image and adjusted, encoded image onto the surface.

10. The method of claim 9, wherein adjusting at least one characteristic of the image to enhance the prominence of the encoded data within the image comprises converting the encoded image to monochrome to yield grayscale data, boosting the contrast of the encoded image, cropping the encoded image to enlarge encoded features of the encoded image, or combinations thereof.

11. The method of claim 9, comprising:

on a three-dimensional (3D) object, masking the surface of the 3D object with the encoded image;

uniformly inflating and deflating the masked 3D surface to produce an encoded relief pattern on the 3D object defining the encoded image.

12. The method of claim 9, wherein printing the monochrome, encoded image onto the surface comprises printing the monochrome, encoded image onto the surface of a two-dimensional print media.

13. A watermark comprising:

an image applied to a surface, the image comprising:

encoded data within the image using the chrominance data of the image; and monochrome-converted grayscale data for the encoded data to enhance the prominence of the encoded data within the image; and a reduced opacity overlay image superimposed over the image.

14. The watermark of claim 13, wherein the image is printed on the surface using a printing device.

15. The watermark of claim 13, wherein the image further comprises a cropped and enlarged image to enlarge encoded features of the image and a contrast-enhanced image adjusted via a high-pass filter.

16. The computer readable storage medium of claim 1, further comprising computer usable program code to, when executed by the processor, crop the encoded image to enlarge encoded features of the encoded image.

17. The system of claim 7, wherein the adjustment module is to apply a spatial low-pass filter to raised and lowered portions of the digital representation of the surface.

18. The system of claim 7, wherein the adjustment module is to pre-warp the digital representation to be geometrically undistorted on the surface when captured from a defined vantage point.

19. The watermark of claim 13, wherein the encoded data is repeated throughout the image.

20. The method of claim 7:

wherein the encoded data is within a first portion of the image; and the method further comprises patterning other portions of the image to be homogenous with the first portion so that the first portion blends in with the image.

* * * * *